United States Patent [19]

Knerr et al.

[11] 3,838,356

[45] Sept. 24, 1974

[54] PARALLEL CONNECTED DIODE DEVICE WITH SUPPRESSION OF ASYMMETRIC MODES

[75] Inventors: Reinhard Heinrich Knerr, Orefield; Clarence Burke Swan, Lower Macungie Township, Lehigh County, both of Pa.

[73] Assignee: Bell Telephone Laboratories, Incorporated, Murray Hill, N.J.

[22] Filed: July 31, 1973

[21] Appl. No.: 384,379

[52] U.S. Cl. .................... 331/56, 330/34, 330/61 A, 331/96, 331/101, 331/107 R

[51] Int. Cl. ........................... H03b 7/14, H03f 3/10

[58] Field of Search ... 331/96, 97, 101, 102, 107 R, 331/107 G, 107 T, 56; 330/34, 54, 61 A

[56] References Cited

UNITED STATES PATENTS 3,582,813 6/1971 Hines ................................ 331/96 X

*Primary Examiner*—Herman Karl Saalbach
*Assistant Examiner*—Siegfried H. Grimm
*Attorney, Agent, or Firm*—David L. Hurewitz

[57] ABSTRACT

When a plurality of negative resistance packaged diodes are connected in electrical parallel and placed in a single resonant cavity, undesired asymmetric modes of oscillation result unless the diodes act cooperatively as a unit. Slots are positioned to open into the cavity and resistive elements are placed in the vicinity of the slot opening to suppress electric field energy associated with these asymmetric modes. Alternatively, lossy magnetic material, such as ferrite, can be placed in the slots to absorb magnetic field energy associated with the assymmetric modes, thereby suppressing these modes.

7 Claims, 9 Drawing Figures

PARALLEL CONNECTED DIODE DEVICE WITH SUPPRESSION OF ASYMMETRIC MODES

BACKGROUND OF THE INVENTION

1. Field of the Invention

This invention relates to microwave resonator devices, more particularly to oscillators and power amplifiers including a single resonant cavity containing parallel connected, negative resistance semiconductor diodes. In accordance with the invention, spurious asymmetric modes of oscillation among the diodes are suppressed.

2. Description of Prior Art

It is desirable to use a plurality of microwave diodes in conjunction with one another to obtain more output power than can be obtained with a single such diode. Schemes to place individual oscillators (each containing a diode and associated circuitry) in parallel have been suggested. These schemes, however, require individual resistors to suppress spurious modes and thereby stabilize each oscillator. However, this arrangement causes DC bias current to each diode to flow through the stabilizing resistor associated with that diode thereby lowering efficiency.

Prior efforts to increase power amplification by placing microwave diodes in series have met with difficulties due to heat sinking problems and due to manufacturing problems associated with various tolerances required to maintain good thermal contact between components. Efforts to increase power amplification by arranging diodes in parallel in a common resonant cavity have met with difficulties due to spurious asymmetric modes of oscillation which exist between individual diodes when parallel connected diodes do not act cooperatively as a single unit. These asymmetric modes are generally undesired because they do not couple efficiently to the output port, because they can occur at frequencies other than the desired frequency and because an imbalance of power in the parallel connected diodes can lead to burn-out of one or more of the diodes.

The object of the invention is to provide increased power in diode devices by electrically paralleling the diodes and positioning them in a single resonant cavity and suppressing the asymmetric modes of oscillation between the parallel diodes.

SUMMARY OF THE INVENTION

In accordance with the invention, a plurality of electrically parallel, negative resistance microwave semiconductor devices, more particularly diodes, are placed in a single resonant cavity. These negative resistance diodes are caused to oscillate and amplify power when they are applied to an appropriate load. Ideally, such an arrangement of parallel diodes should act cooperatively as a unit and appear to external circuitry as one large diode, i.e., the diodes should oscillate in phase with equal voltages. However, asymmetric modes of oscillation can exist if there are any asymmetric resonances occurring within the frequency band where the diodes exhibit negative resistance. The nature of such modes has been described by K. Kurokawa, "An Analysis of Rucker's Multidevice Symmetric Oscillator" *IEEE Transactions on MTT;* Vol. MTT-18, No. 11, 1970, pp. 967–969.

The invention is directed to suppressing these asymmetric modes, thereby increasing device efficiency. This suppression is accomplished by using a combination of slots and resistive elements to dissipate power from the electric fields of asymmetric modes or by using a combination of slots and a lossy magnetic material, to absorb power from the magnetic fields of asymmetric modes.

The diodes are mounted in a resonator located at an end of a coaxial structure and the diodes are electrically connected between the center and outer coaxial conductors. Slots are cut axially into the center conductor so that they are not energized by the desired cooperative mode of operation, but they are positioned so that they are energized by the asymmetric modes. Dissipative material, either electrically resistive or magnetically lossy, is appropriately located to suppress the asymmetric modes supported by the slots. Of course, other dual conductor structures such as planar transmission lines (microstrip and stripline) may be adapted for use with this invention in place of the coaxial structure.

A two diode embodiment of the invention uses a single axial slot opening into the resonant cavity, and a single resistive element is placed in the vicinity of the slot opening where the resistive element couples to the electric field of the asymmetric mode. This single slot extends across the entire diameter of the inner conductor and may be viewed alternatively as two radially arranged slots placed 180° apart. A three diode embodiment uses three radially arranged slots positioned 120° apart in conjunction with three resistive elements.

In these "electric field" embodiments of invention resistive elements are positioned where there is appreciable electric field intensity associated with asymmetric modes and negligible electric field intensity associated with the desired cooperative mode. Two other embodiments, which are the magnetic duals of the above electric field embodiments, use lossy magnetic material within the slot to couple to the magnetic fields associated with asymmetric modes.

BRIEF DESCRIPTION OF THE DRAWINGS

FIG. 7 shows the three diodes in symmetric oscillation and FIG. 8 shows two of three diodes in asymmetric oscillation.

DETAILED DESCRIPTION

Figure 1:
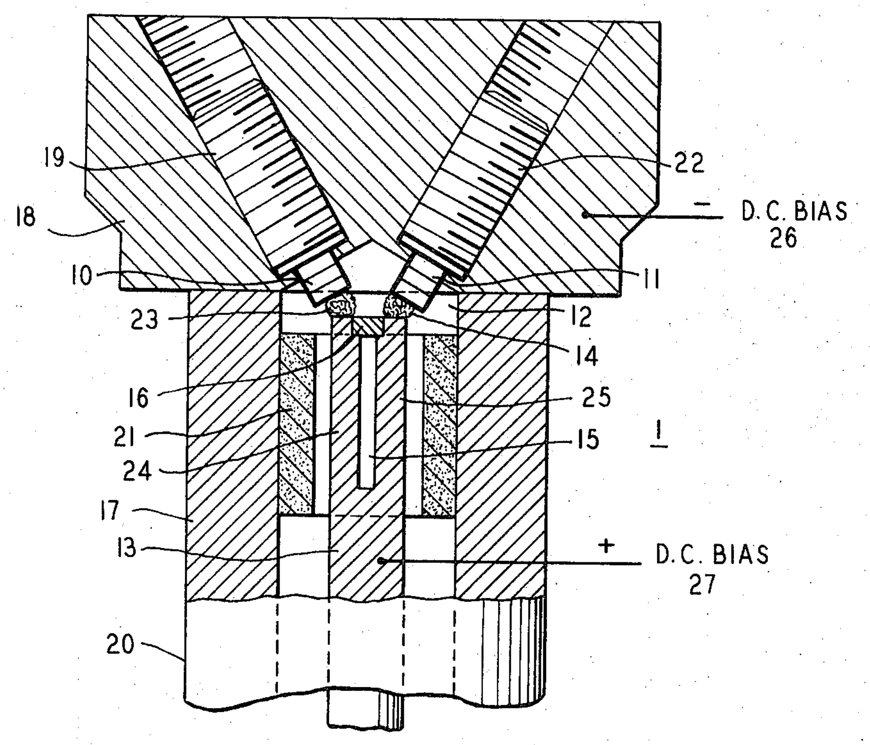
FIG. 1 is a longitudinal section of a two diode embodiment which utilizes electric field suppression in accordance with the invention.
Figure 2:
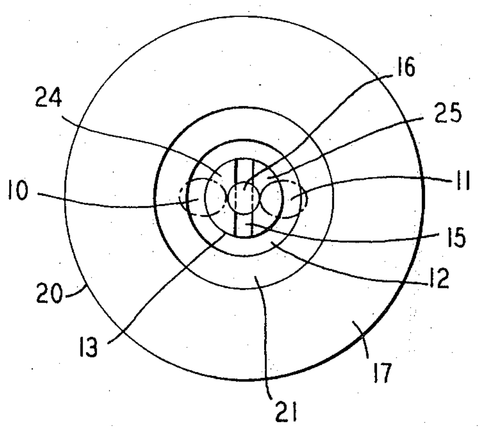
FIG. 2 is a cross-section view through the resonant cavity of the embodiment of FIG. 1 showing diodes 10 and 11 in elliptical section.

FIGS. 1 and 2 show a microwave generating device with the mode suppressing capability according to the invention. Two parallel connected, negative resistance packaged diodes 10 and 11 are shown in a resonant cavity 12. The package is frequently referred to as a pill package and conventionally utilizes the two ends of the package as the external electrical contacts, but hereinafter packaged diodes will be referred to simply as diodes.

One side of each of diodes 10 and 11 makes electrical contact with an inner coaxial conductor 13 through contacts 14 and 23. The other side of each is connected electrically to the outer conductor 17 via block 18. The block 18 also provides support for screws 19 and 22 which hold diodes 10 and 11 in place, and block 18 may further be used as a heat sink.

A slot 15 is cut axially into the inner conductor 13 and opens into the resonant cavity 12 which is physically bounded by the block 18 and the coaxial structure 20. The electrical boundary of the resonant cavity may, of course, extend into surrounding members due to fringing. A resistive element 16 is positioned in the vicinity where the slot 15 opens into the resonant cavity 12. Each diode makes electrical contact with a separate section 24 or 25, of the inner conductor 13, as can be seen in FIG. 2.

The coaxial line 20 serves as both input and output port for signals. Alternatively stated, the entire device 1 functions as a single port reflection amplifier or oscillator. A coaxial transformer 21 is positioned between the inner coaxial conductor 13 and the outer coaxial conductor 17.

The slot is machine bored from a recess (not shown) in the inner coaxial conductor along the axis of the inner coaxial conductor. The slot length is chosen so that the slot acts electrically as a short segment of transmission line, exhibiting inductance to asymmetric modes of oscillation between diodes. The electrical length of the slot can be approximately one-quarter $\lambda$, where $\lambda$ is the wavelength of the undesired asymmetric mode frequency, but the slot may be physically shortened by dielectric loading.

Asymmetric modes of diode oscillation cause voltages to appear across the slot mouth while symmetric modes do not. Accordingly, a single resistive element 16, which is positioned in a recessed pocket, not shown, in the vicinity of the slot mouth, will heavily load these asymmetric modes and dissipate power associated with them, thereby suppressing them. This resistive element has no effect on symmetric modes since for these symmetric modes both ends of the resistor are at the same potential.

The slot and resistive element function together. Neither the slot nor the resistive element alone operate effectively to suppress asymmetric modes of oscillation among diodes. If a resistive element were present without a slot, the inner conductor would itself be an alternative parallel short circuit pathway around the resistive element. If a slot itself were present without a resistive element, as a first approximation, this slot would appear to the parallel diodes as an inductance. This inductance has an associated impedance which, when seen by the diodes, determines the frequencies of the asymmetric resonant modes among the diodes. This impedance is high and in theory, when the slot depth is one-quarter wavelength of the frequency of an asymmetric mode, a short circuit exists at the bottom of the slot which, when reflected up the slot to the slot opening into the resonant cavity, becomes an infinite impedance or open circuit. If no resistive element were present, a complete diode circuit would exist and diode oscillations would occur if this circuit had a resonance in the negative resistance band of the diodes, but no mode suppression would occur. When both the resistive element and slot are present, suppression of the asymmetric modes occurs for all frequencies except those for which the slot is approximately a multiple of a half wavelength in which case the slot appears as a short circuit. Judicious choice of the slot length assures that their frequencies are well above the negative resistance band of the diodes and no asymmetric oscillations can occur. In practice, a high finite impedance to spurious modes is sufficient and the slot's electrical depth is not critical.

Since, in accordance with this invention, all diodes are in one resonant cavity, they can all be biased from a single regulated current source which is applied via terminals 26 and 27, and only one microwave circuit is needed. In addition, the circuit exhibits a low Q and permits the device to be used as a broadband amplifier. The advantages of this parallel connected diode circuit are that high efficiency is obtained because no individual diode powered by the single regulated current source can build up voltage at the expense of other diodes and because the DC bias is applied directly across the diodes and not across both the diodes and a dissipating resistive element. Burnout of individual diodes is also inhibited because radio frequency voltage levels are constrained to be identical by the parallel connection. In addition, existing diode package design may be utilized since effective heat sinking is provided by block 18.

Figure 3:
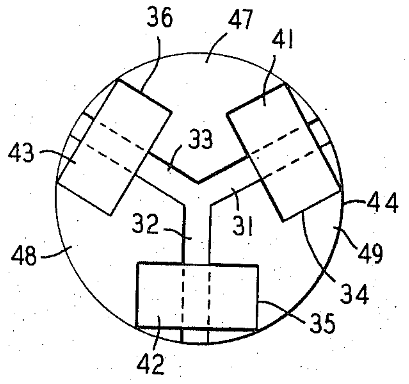
FIG. 3 is a cross-section view of an inner coaxial conductor viewed from a resonant cavity of a three diode embodiment in accordance with the invention.

FIG. 3 is a cross-section view through a three diode electric field embodiment of invention. It utilizes three radially arranged slots 31, 32 and 33 which divide the inner conductor 44 into three sections 47, 48 and 49. Three resistive elements 41, 42 and 43 are soldered in recesses 34, 35 and 36 formed over slots 31, 32 and 33, respectively. The resistive elements may be deposited on ceramic substrates. The radially arranged slots 31, 32 and 33 are of constant depth at all points and one such slot 32 is shown in side view in FIG. 4. Each of the three diodes (not shown) must be separated from each of the other two diodes by the slots so that each diode is in contact with only one section 47, 48 or 49, of the inner conductor.

Theoretically, N parallel diodes could be combined by using a radial slot arrangement which would divide the inner conductor into N equal sections.

Figure 5:
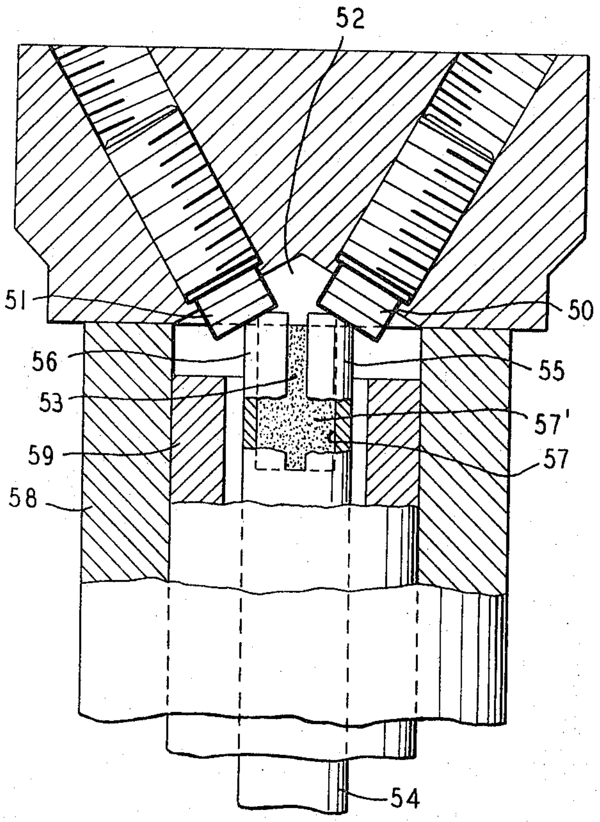
FIG. 5 is a longitudinal section of a two diode embodiment which utilizes magnetic field suppression in accordance with the invention.

FIG. 5 is a longitudinal section of a two diode embodiment which is the magnetic dual of a two diode electric field embodiment of FIGS. 1 and 2. Diodes 50 and 51 are shown in a resonant cavity 52. It is understood that the boundaries of the resonant cavity may extend into surrounding structures.

Figure 6:
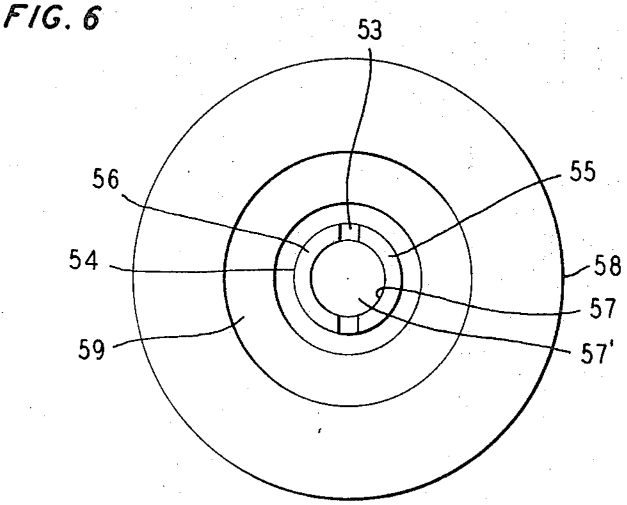
FIG. 6 is a cross-section view through the cavity of FIG. 5.

As is shown more clearly by reference to FIG. 6, which is a cross-section view through the cavity of FIG. 5, a slot 53 is cut through the inner conductor 54 separating the inner conductor 54 into two sections 55 and 56. A circular hole 57 is cut in the inner conductor 54, enlarging an internal portion of slot 53, as seen in the cut-away portion of FIG. 5. The hole 57 is filled with a cylindrical lossy magnetic material 57' which may be ferrite. Alternatively, the same effect could be achieved without the hole 57 by using an appropriately shaped bar of lossy magnetic material in the slot 53. Each diode (not shown) is in contact with a separate section of the inner conductor. Outer conductor 58 and transformer 59 perform as in the electric field embodiments.

Figure 4:
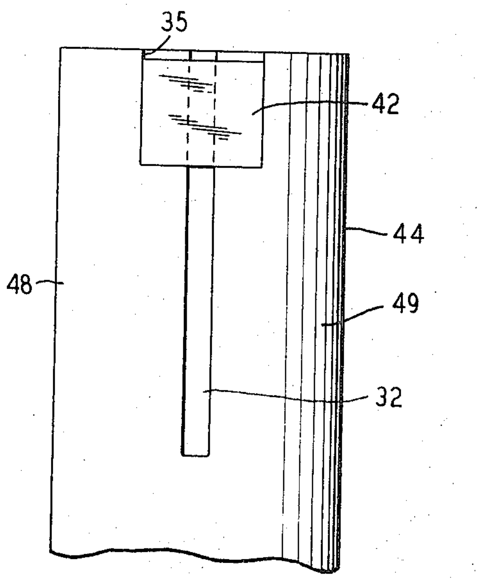
FIG. 4 is a side view of FIG. 3.
Figure 7:
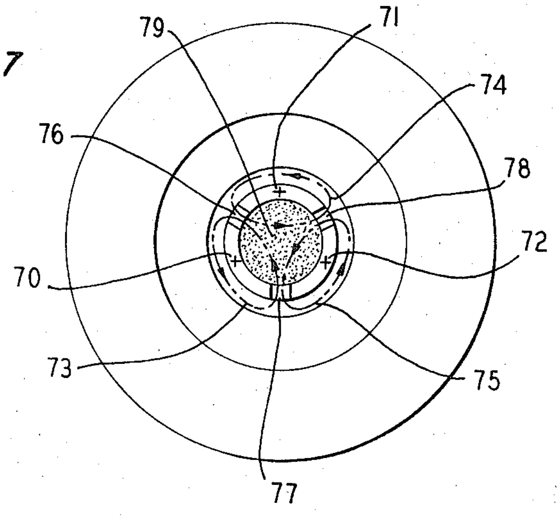
FIGS. 7 and 8 are cross-section views of a three diode modification of the embodiment of FIG. 5.

FIG. 7 is a cross section view through a three diode magnetic field embodiment which is the dual of the three diode electric field embodiment of FIGS. 3 and 4. This figure illustrates an electric current and magnetic field pattern which may exist when the diodes (not shown) operate symmetrically. The electric field signs 70, 71 and 72 are used to indicate the polarity of current flowing into or out of a diode at its contact point to its associated piece of inner conductor. A plus (+) sign indicates current flowing into a diode from the inner conductor (out of the paper) and a negative (−) sign indicates current flowing out of a diode. The magnetic field lines 73, 74 and 75 are drawn to conform with the polarity of the electric current as shown by signs 70, 71 and 72. During symmetric oscillation of the diodes the electric currents are the same in all three conductor sections (signs illustrated as all positive) and accordingly, the directions of magnetic field lines 73, 74 and 75 oppose one another in all three slots 76, 77 and 78. Thus, there is cancellation and with no net magnetic fields within the hole 79 there is no energy absorption by the lossy ferrite material within the hole.

Figure 8:
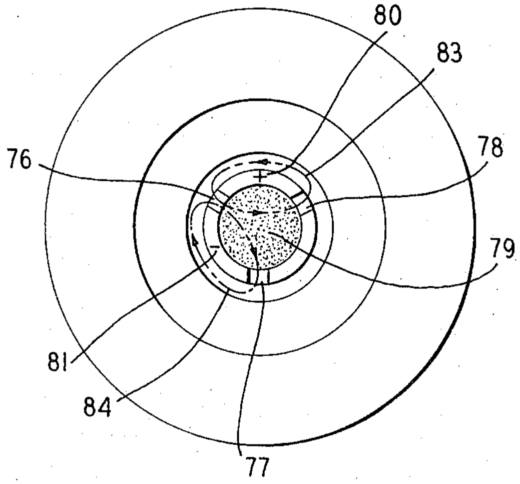

FIG. 8 is a cross-section view through the three diodes magnetic field embodiment illustrating an electric current and magnetic field pattern which may exist when two of the three diodes (not shown) oscillate asymmetrically. Electric current signs 80 and 81 are opposite, indicating current is flowing in opposite directions through the diodes, and associated magnetic field lines 83 and 84 do not cancel in the slot 76. Accordingly, if the energy associated with these uncancelled fields is absorbed these asymmetric modes will be suppressed. Lossy magnetic material is positioned where there are significant magnetic field intensities associated with asymmetric modes, i.e., in the cylindrical hole 79, or in the absence of that hole, in the three interconnected slots. Hence, as in electric field embodiments where resistive elements are positioned where there are significant electric field intensities associated with spurious asymmetric modes, the energy associated with the undesired modes is suppressed.

Figure 9:
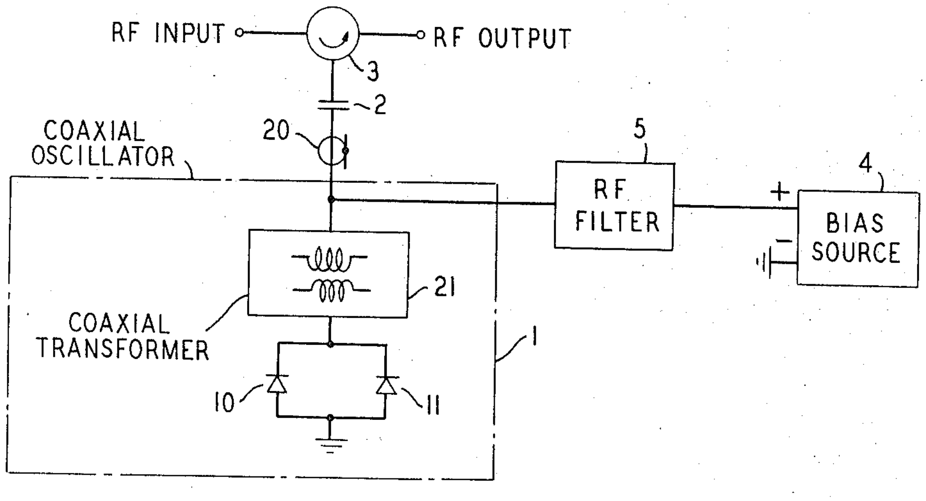
FIG. 9 is a block-schematic diagram of a parallel diode oscillator.

FIG. 9 shows the coaxial oscillator device 1 which is a schematic representation of FIG. 1 as seen by the symmetric mode. The coaxial line 20 from the device is connected through DC blocking capacitor 2 to a circulator 3. Capacitor 2 prevents DC currents from the bias source 4 from entering the circulator 3. An RF filter 5 prevents coupling of RF signals to bias circuitry.

In all cases it is to be understood that the above described arrangements are merely illustrative of a small number of the many possible applications of the principles of the invention. Numerous and varied other arrangements in accordance with these principles may be readily be devised by those skilled in the art without departing from the spirit and scope of the invention.

What is claimed is:

1. A microwave device comprising:

a plurality of packaged diodes capable of producing asymmetric modes of oscillation;

a structure for mounting the diodes, said mounting structure including a resonant cavity, the diodes being positioned within the resonant cavity;

a coaxial line, having an outer conductor and an inner conductor, coupled to the resonant cavity;

said mounting structure further including means for electrically connecting the outer conductor of the coaxial line to one side of each of the diodes and means for connecting the inner conductor electrically to the other side of each of the diodes, so that the diodes are connected in electrical parallel;

the inner coaxial conductor having at least one axial slot arranged to divide the inner conductor into at least two sections, each of said sections being in electrical contact with the other side of one diode;

said slot opening into the resonant cavity and having a resistive element positioned across a portion of the slot opening where there are significant electric fields associated with the asymmetric modes to dissipate the asymmetric modes.

2. A device as described in claim 1 wherein said plurality of diodes is two diodes and a single axial slot is formed in the inner coaxial conductor and a single resistive element is positioned across the slot opening where there are significant electric fields associated with asymmetric modes.

3. A device as described in claim 1 where said plurality of diodes is three diodes and the inner coaxial conductor is divided into three sections by three radially arranged slots spaced 120° apart, each said section being in electrical contact with the other side of one diode and each said radial slot having a resistive element positioned in the vicinity of the opening of the slot into the resonant cavity.

4. A microwave device comprising:

a plurality of packaged diodes capable of producing asymmetric modes of oscillation;

a structure for mounting the diodes, said mounting structure including a resonant cavity, the diodes being positioned within the resonant cavity;

a coaxial line, having an outer conductor and an inner conductor, coupled to the resonant cavity;

said mounting structure further including means for electrically connecting the outer conductor of the coaxial line to one side of each of the diodes and means for connecting the inner conductor electrically to the other side of each of the diodes, so that the diodes are connected in electrical parallel;

the inner coaxial conductor having at least one axial slot arranged to divide the inner conductor into at least two sections, each of said sections being in electrical contact with the other side of one diode;

said slot opening into the resonant cavity and having within said slot a lossy magnetic material to couple to and absorb magnetic field energy associated with the asymmetric modes.

5. A device as described in claim 4 wherein the inner coaxial conductor has an axial slot extending physically across the entire diameter of the inner conductor, thereby dividing the inner conductor into two sections, said inner conductor having a single hole cut axially through the sections of the inner conductor, and having lossy magnetic material placed in such hole to couple to and to absorb the magnetic field energy associated with the asymmetric modes.

6. A device as described in claim 4 wherein the inner coaxial conductor is divided into three sections by three radially arranged slots spaced approximately 120° apart, each said section being in electrical contact with the other side of one diode, said inner conductor having a single hole cut axially through the sections of inner conductor, said hole containing lossy magnetic material placed where there are significant magnetic fields associated with the asymmetric modes to couple to and absorb energy from these fields, thereby suppressing the asymmetric modes.

7. A microwave structure comprising:

a plurality of packaged diodes connected in electrical parallel capable of producing asymmetric modes of oscillation;

a coaxial line having an outer conductor and an inner conductor;

means for electrically connecting the outer conductor of the coaxial line to one side of each of the diodes;

means for connecting the inner conductor electrically to the other side of each of the diodes;

the structure being adapted to form a resonant cavity containing the diodes;

the inner coaxial conductor having at least one axial slot opening into the resonant cavity; and a dissipative means positioned in the vicinity of the one slot to suppress the asymmetric modes of oscillation between the diodes.

* * * * *